(12) United States Patent
Ishii

(10) Patent No.: US 7,375,872 B2
(45) Date of Patent: May 20, 2008

(54) METHODS AND CONFIGURATIONS FOR MANUFACTURING HINGES FOR MICRO-MIRROR DEVICES

(75) Inventor: Fusao Ishii, Menlo Park, CA (US)

(73) Assignee: Silicon Quest Kabushiki-Kaisha, Kanagawa (JP)

( * ) Notice: Subject to any disclaimer, the term of this patent is extended or adjusted under 35 U.S.C. 154(b) by 249 days.

(21) Appl. No.: 11/187,248

(22) Filed: Jul. 23, 2005

(65) Prior Publication Data

US 2006/0018005 A1    Jan. 26, 2006

Related U.S. Application Data

(63) Continuation-in-part of application No. 10/918,677, filed on Aug. 14, 2004, now Pat. No. 7,183,618, which is a continuation-in-part of application No. 10/698,620, filed on Nov. 1, 2003, now abandoned.

(51) Int. Cl.
*G02B 26/00* (2006.01)
*G02B 26/08* (2006.01)
*G02F 1/29* (2006.01)

(52) U.S. Cl. .................. 359/290; 359/291; 359/295; 359/298

(58) Field of Classification Search ............... 359/290, 359/291, 292, 295, 298, 237
See application file for complete search history.

(56) References Cited

U.S. PATENT DOCUMENTS 6,377,233 B2 * 4/2002 Colgan et al. .............. 345/84
2004/0061961 A1 * 4/2004 Valette ...................... 359/872

* cited by examiner

*Primary Examiner*—Ricky L Mack
*Assistant Examiner*—Brandi N Thomas
(74) *Attorney, Agent, or Firm*—Bo-In Lin

(57) ABSTRACT

An image display system includes an improved hinge for a micro-mirror device composed of a conductive doped semiconductor and immune to plastic deformation at typical to extreme temperatures. The hinge is directly connected to the micro-mirror device and facilitates the manufacturing of an optically flat micro-mirror. This eliminates Fraunhofer diffraction due to recesses on the reflective surface of the micro-mirror. In addition, the hinge is hidden from incoming light thus improving contrast and fill-factor. The image display system further includes signal transmission metal traces formed on areas between the doped semiconductor hinges. The signal transmission metal traces are formed either before or after a high temperature crystallization process is applied to the hinges.

27 Claims, 12 Drawing Sheets

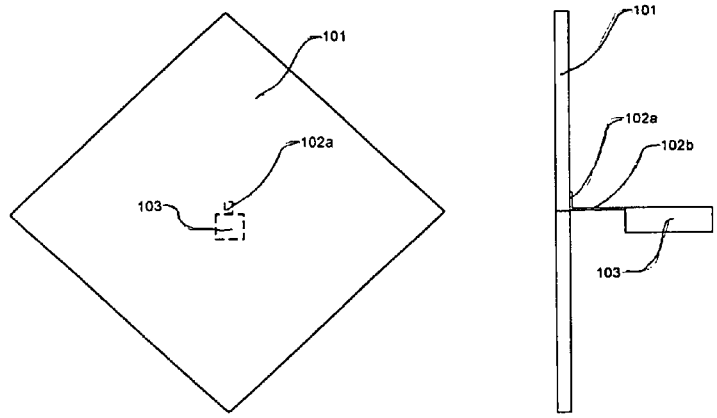
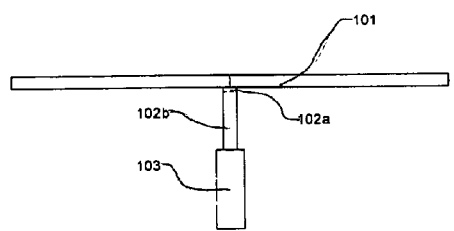
FIG. 2A
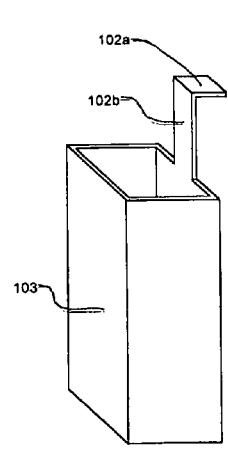
FIG. 2B
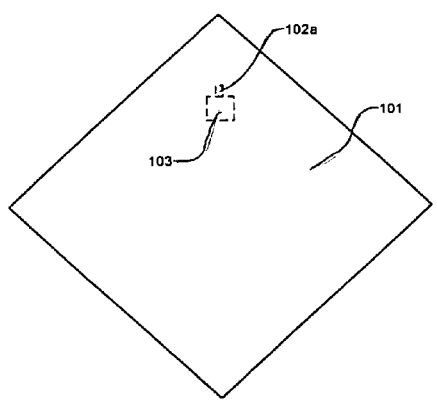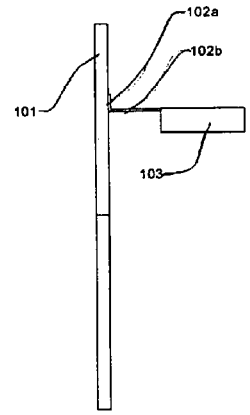
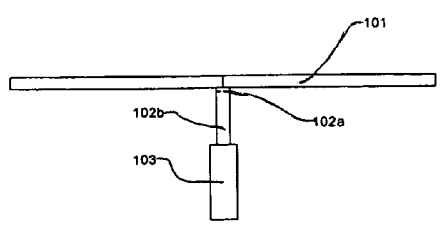
FIG. 2C Re < 0.5

05. < Re < 70

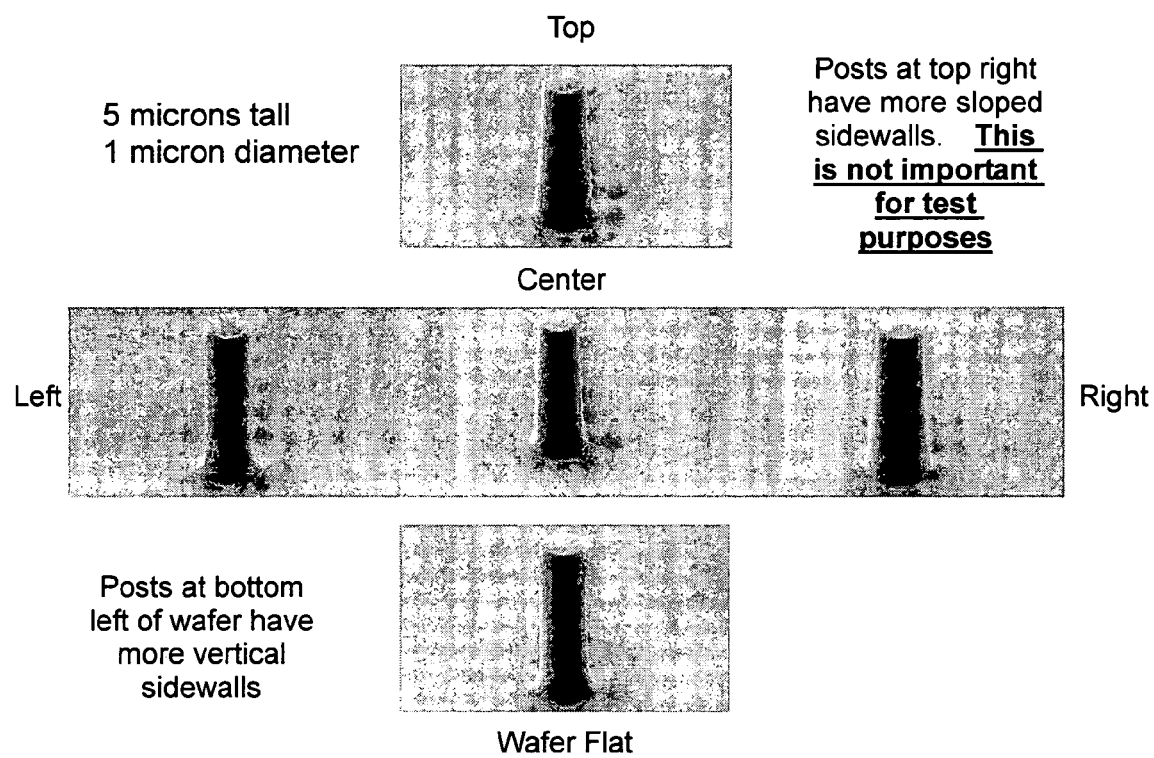
FIG. 8A Post Formation

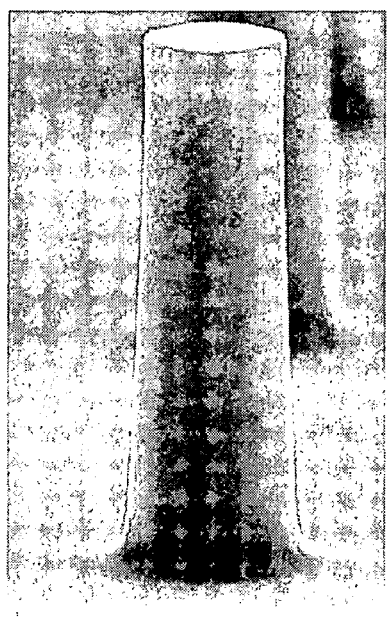
FIG. 8B Post Formation
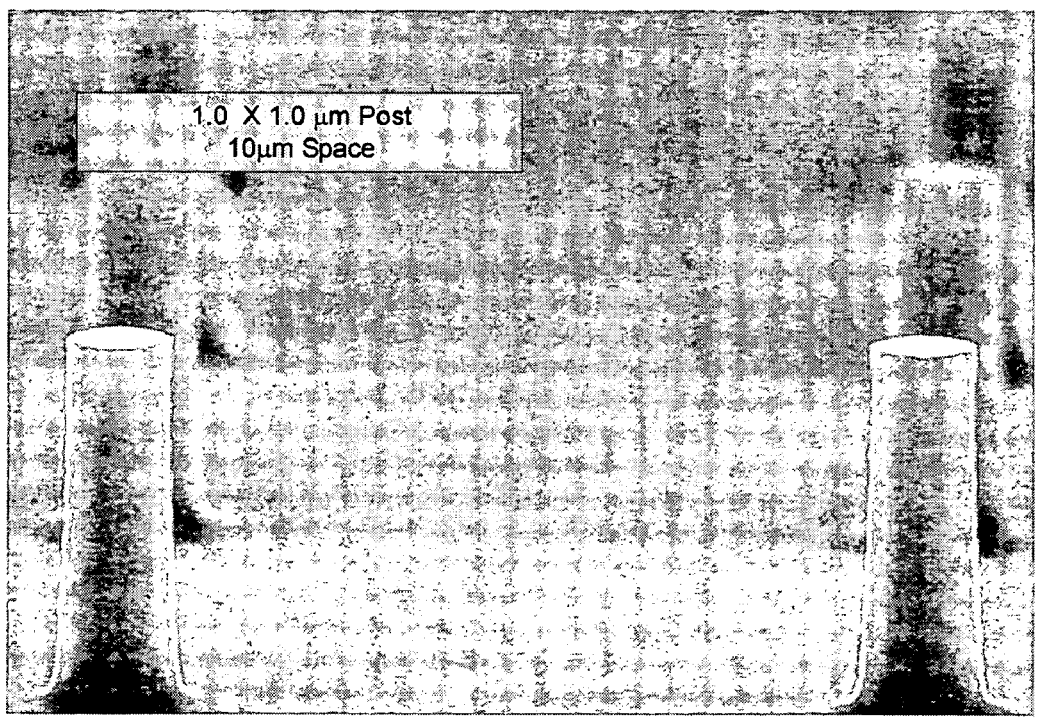
FIG. 8C Post Formation

Resist B
6cp, 1970rpm
10,750A
Wafer Center
Wafer Edge
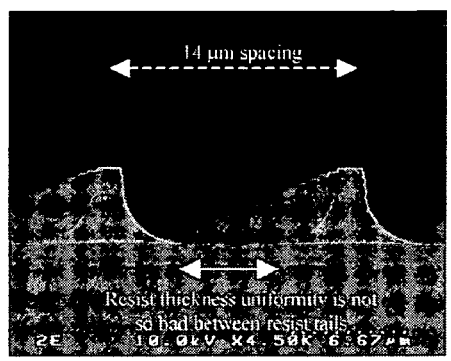
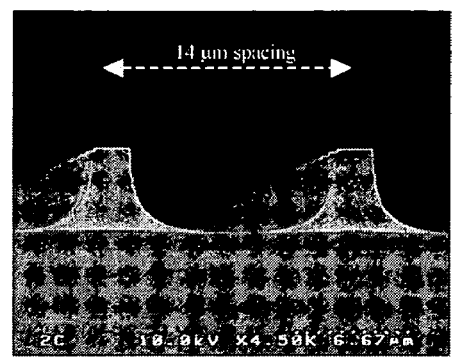
FIG. 9A
FIG. 9B
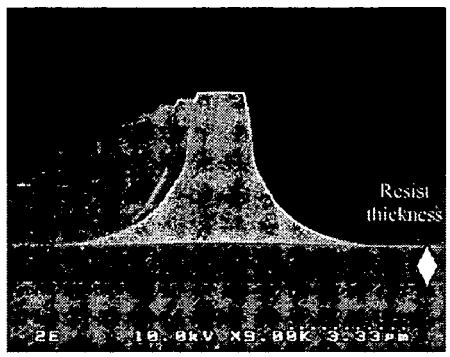
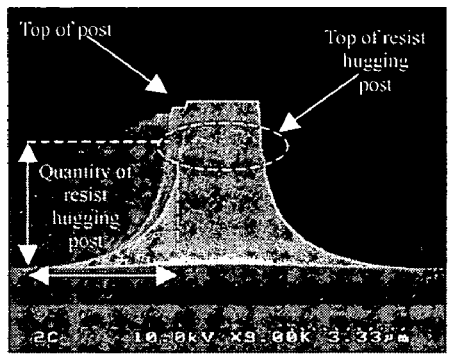
FIG. 9C
FIG. 9D

METHODS AND CONFIGURATIONS FOR MANUFACTURING HINGES FOR MICRO-MIRROR DEVICES

This application is a Continuation in Part (CIP) Application of pending U.S. patent application Ser. No. 10/698,620 filed on Nov. 1, 2003, now abandoned, and Ser. No. 10/918,677 filed on Aug. 14, 2004, now U.S. Pat. No. 7,183,618, by the Applicant of this patent applications. The disclosures made in these patent applications are hereby incorporated by reference in this patent application.

TECHNICAL FIELD

This invention relates to micromirror arrays and control circuits to control the micromirrors. More particularly, this invention relates to micromirror array and methods for manufacturing a plurality of micromirrors wherein each micromirror has a reflecting mirror supported on a doped semiconductor hinge.

BACKGROUND ART

Even though there are significant advances made in recent years on the technologies of implementing electromechanical micromirror devices as spatial light modulator, there are still limitations and difficulties of practical usefulness of the micromirrors due to the reliability problems caused by the limited life time of the micromirror hinges employed to support the micromirrors. Specifically, the metal hinges commonly implemented in the commercially available micromirrors tend to have mechanical fatigue and creep phenomena especially when operated in an elevated temperature. Manufacturers chose metals to make hinges for supporting the micromirrors because the simpler and more convenient processes for manufacturing the metal hinges.

Metal wires cannot be eliminated because they are necessary to control MOS drivers under mirrors and hinges. Once metal lines are formed, high temperature processes applied to the wafers are not permissible due to the concerns that the metal lines will melt or damaged at elevated temperatures. For example, aluminum is typically used for wiring. A temperature higher than 400 Celsius applied to the wafer is likely to cause damages to the aluminum wires. Aluminum will be damaged over 400 degree C. It is very natural for the DMD manufacturer to choose metal for hinges and mirrors, because it does not require higher temperature than 400 degree C. to form hinges and mirrors. Conversely, high temperature processes are often required to strengthen the hinges made of a semiconductor. For these reasons, the difficulties of unreliable metal hinges that often encountered in the conventional micromirror device cannot be easily resolved.

There is a great demand to overcome such problems. Specifically, the field of micro-electromechanical systems (MEMS) has experienced an explosive growth during the last decade having found applications in accelerometers, pressure sensors, actuators and the miniaturization of various other mechanical devices. Electromechanical micromirror devices are an example of a MEMS device that has drawn considerable interest because of their application as spatial light modulators (SLMs).

A spatial light modulator requires an array of a relatively large number of such micromirror devices. In general, the number of devices required ranges from 60,000 to several million for each SLM. A digital micro-mirror device (DMD) is one example of a micro-mechanical SLM. One or more hinges support each mirror and allow the mirrors to tilt. Images are formed by selectively tilting each mirror to reflect or not reflect an incident source of light onto an image plane.

In a typical video application, each mirror is expected to switch over thousand times per second. Therefore, the design and material of the hinge is critical to DMD reliability.

The main reliability concern regarding the hinge is plastic deformation. Through continued use and operation in extreme temperatures, the hinge undergoes mechanical deformation, also known as creep. The relaxation of the hinge results in a residual tilt when all voltages are removed. This, so called hinge memory, is discussed in Douglass, "Lifetime Estimates and Unique Failure Mechanisms of the Digital Micromirror Device," IEEE International Reliability Physics Symposium, 36th Annual, pp. 9-16, April 1998. As discussed in this paper, mirrors will not function properly when the residual tilt exceeds approximately 35 to 40% of the 10-degree rotation angle. In addition, while duty-cycle contributes to creep, the dominant factor for hinge memory lifetime is temperature.

In U.S. Pat. No. 5,142,405, the mirror is tilted by means of an electrostatic force created by biasing the mirror and address electrodes appropriately. The advantage of biasing the mirror is that a lower address voltage can be used to achieve electrostatic motion. Through the use of the appropriate mirror bias, bistable operation can be achieved with standard 5V CMOS address circuitry. The address voltage applied, however, requires enough operating margin to compensate for the residual tilt resulting in further design complexity.

U.S. Pat. No. 5,083,857 describes a DMD pixel architecture that improves contrast and brightness by placing the hinge and mirror support post under the rotatable mirror surface. The hinge, however, is composed of an aluminum alloy that is highly susceptible to metal creep. In addition, the support post connecting the hinge to the mirror forms a recess on the surface of the mirror. This recess is defined by the edges of the support post and is also known as a spacervia. The edges of the spacervia diffract the incident light into the projection system optics when the mirrors are tilted to the off state, thus limiting the pixel architecture's improvement to contrast ratio. This diffraction effect is known as Fraunhofer diffraction.

U.S. Pat. No. 6,038,056 improves upon the prior art of U.S. Pat. No. 5,083,857 by reducing Fraunhofer diffraction resulting from the support post edges. This is accomplished by reducing the dimensions of the support post edges and orienting the support post edges and mirror edges to be parallel to each other and at 45-degrees with respect to the incident light.

U.S. Pat. No. 5,631,782 and U.S. Pat. No. 6,447,126 describe a mirror support pillar in which the top of the pillar is covered and closed. This improvement eliminates the recess on the mirror surface of prior art and thus provides a method to eliminate the diffraction due to spacervias. However, this process cannot produce an optically flat mirror since the underlying spacer layer is not flat.

U.S. Pat. No. 5,652,671 also improves upon the prior art by proposing a hinge fabricated from alternating layers of different materials. While this reduces the hinge memory by providing a more elastic hinge, it does not eliminate it. Furthermore, the formation of the multi-layer hinge results in a more complicated manufacturing process as compared to a hinge made of a single material.

Alternatives to hinges composed of metal alloys are hinges composed of semiconductor material. Silicon is the dominant material used throughout the IC industry today. Furthermore, single crystal silicon is considered a perfect elastic material at normal temperatures. As discussed in Gad-el-Hak, M., ed., The MEMS Handbook, Boca Raton, CRC Press, 2002, pg. 16-23, silicon exhibits no plastic deformation or creep below 800 degrees Celsius. In addition, impurity atoms, also known as dopants, can be introduced into the semiconductor thereby altering its electrical properties. The result is a doped semiconductor in which its conductivity can be controlled by dopant concentration. These characteristics offer significant advantages over aluminum alloy hinges in both reliability and manufacturing complexity.

U.S. 20030234994 describes a reflective SLM in which the hinge is composed of doped silicon and the mirror is biased appropriately to achieve electrostatic deflection under a 5V CMOS design. U.S. 20040141894 also describes a micromirror unit composed of doped silicon. These and other prior art utilizing doped semiconductors for their hinge material fail to provide a device architecture in which the hinge is hidden from incoming light. This is an important disadvantage which results in poor contrast and fill-factor in applications such as image projection.

Despite significant advances that have been made in recent years, there is still a need for improvement in the performance and reliability of these hinges. Specifically, there is a need in the art for a conductive hinge that is less complex to manufacture and not susceptible to creep under typical to extreme temperatures. In addition, there exists a need for a hinge architecture that facilitates the fabrication of an optically flat mirror and hidden hinge thus eliminating Fraunhofer diffraction while improving contrast and fill-factor.

Furthermore, there is a need to improve the manufacturing processes to fabricate hinges with strengthened operational characteristics by applying processes that apply elevated temperatures. The improved high temperature processes must be employed without causing damages to the metal wires required for transmitting signals from the control circuits to control the operations of the micromirrors.

SUMMARY OF THE INVENTION

The present invention provides a hinge for a micro-mirror device that overcomes some of the limitations of the prior art. According to the present invention, a hinge is composed of a doped semiconductor and designed such that it connects directly to the micro-mirror surface opposite the substrate.

Many of the advantages of the present invention are due to the material of which the hinge is composed. A doped semiconductor hinge offers a conductive means by which the micro-mirror can be biased while improving elasticity and simplifying the manufacturing process. In addition the material is robust under extreme temperatures and immune to the memory hinge effects caused by creep. Furthermore, the hinge architecture according to the present invention facilitates the fabrication of an optically flat mirror and hidden hinge further simplifies the manufacturing process by allowing a direct connection to the micro-mirror.

The present invention further provides new and improved processes for fabricating the micromirrors and the control circuits with the metal wires for transmitting control signals. The improved processes allow for high temperature process to crystallize and strengthen the doped semiconductor hinges without damaging the metal wire and metal connections to the transistors such that more reliable semiconductor hinges can be formed while avoiding damages to the metal layers.

BRIEF DESCRIPTION OF THE FIGURES

FIGS. 2A-2C show top, side, and perspective views of the hinge according to the present invention in an alternate embodiment.

FIGS. 8A to 8C are photographic images of micromirror hinges as posts.

FIGS. 9A to 9D are photographic images of photoresist spin coating tests for showing the resist layer uniformity.

DETAILED DESCRIPTION OF THE INVENTION

Figure 1A:
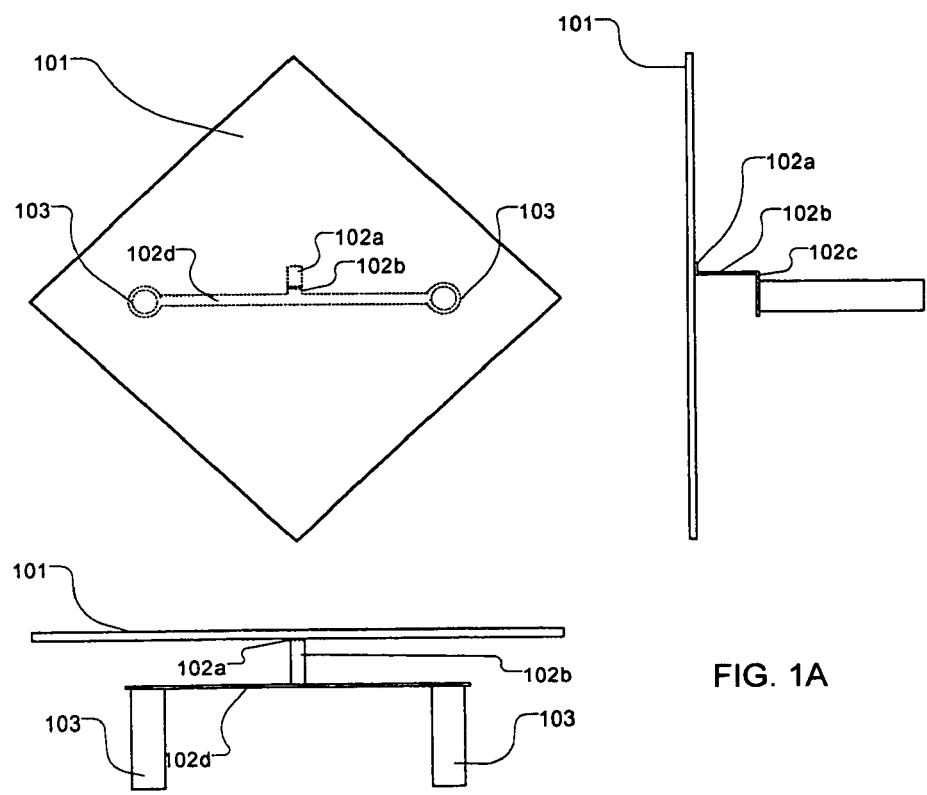
FIGS. 1A and 1B show top, side, and perspective views of the hinge according to the present invention in the preferred embodiment.
Figure 1B:
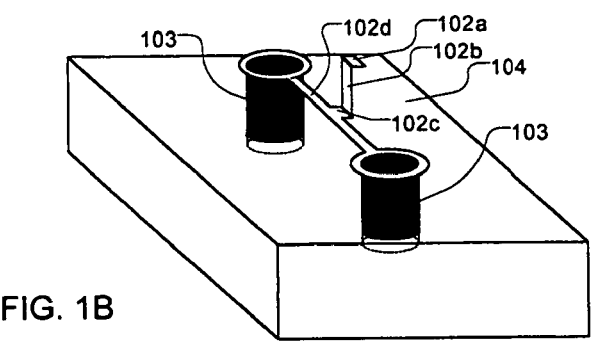

FIG. 1A shows top and side views of the hinge according to the present invention in the preferred embodiment. In this figure, hinge 102, best described as a compound torsion vertical cantilever, is composed of segments 102a, 102b, 102c and 102d. Segment 102a extends out parallel to the substrate surface and is connected directly to the surface of micro-mirror 101 opposite the substrate. Segment 102b extends out perpendicular to the substrate surface and is connected to segment 102a. The other end of segment 102b is connected to an extension (102c) of segment 102d. Segment 102d is itself a direct extension of support posts 103. Support posts 103 extend below the surface of the substrate (104) and anchor the compound hinge structure (102) to the substrate (104). The thickness of hinge 102 is small relative to the micro-mirror in order to ensure most of the bending occurs at the hinge. This improves the flatness of the micro-mirror in its deflected state. FIG. 1B shows a perspective view of the hinge according to the present invention in the preferred embodiment.

FIGS. 2A-2C show the top, side and perspective views of the hinge according to the present invention in an alternate embodiment. In these figures, hinge 102, best describe as a vertical cantilever, is composed of segments 102a and 102b. Segment 102a extends out parallel to the substrate surface and is connected directly to the surface of micro-mirror 101 opposite the substrate. Segment 102b extends out perpendicular to the substrate surface and is connected to segment 102a. Segment 102b is itself a direct extension of support post 103. FIG. 2C shows a slight modification to the alternate embodiment in FIG. 2A in which the contact point between the micro-mirror (101) and hinge 102 is located away from the geometric center of the micro-mirror (101).

Figure 3A:
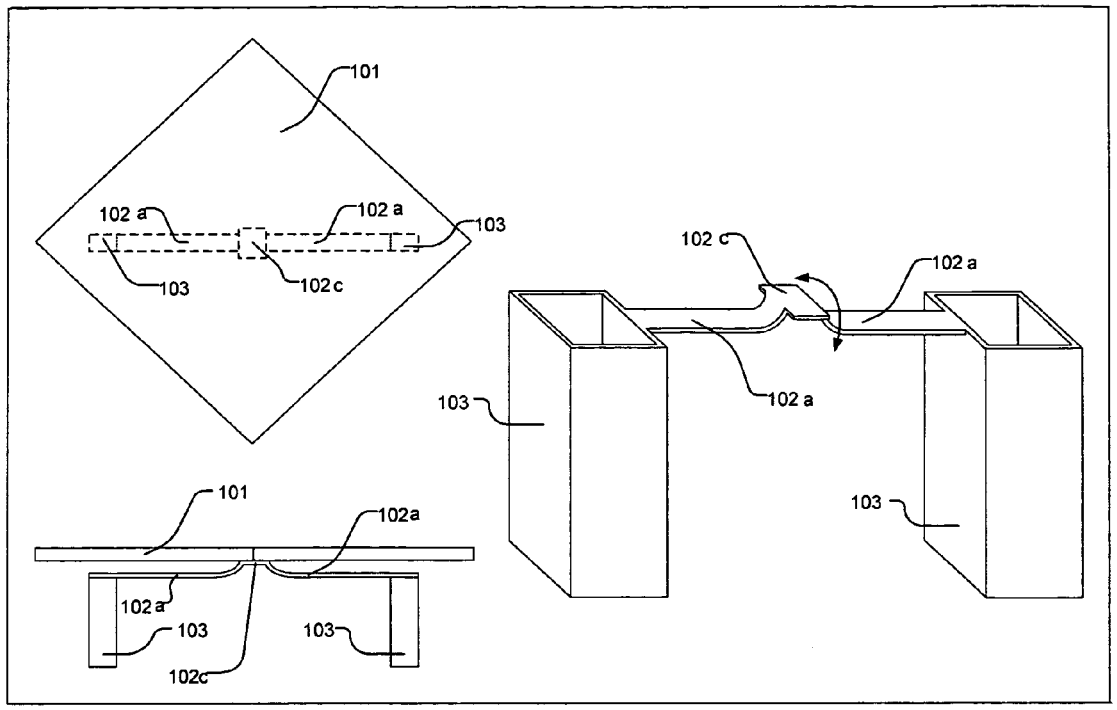
FIGS. 3A and 3B show top, side, and perspective views of the hinge according to the present invention in a second alternate embodiment.
Figure 3B:
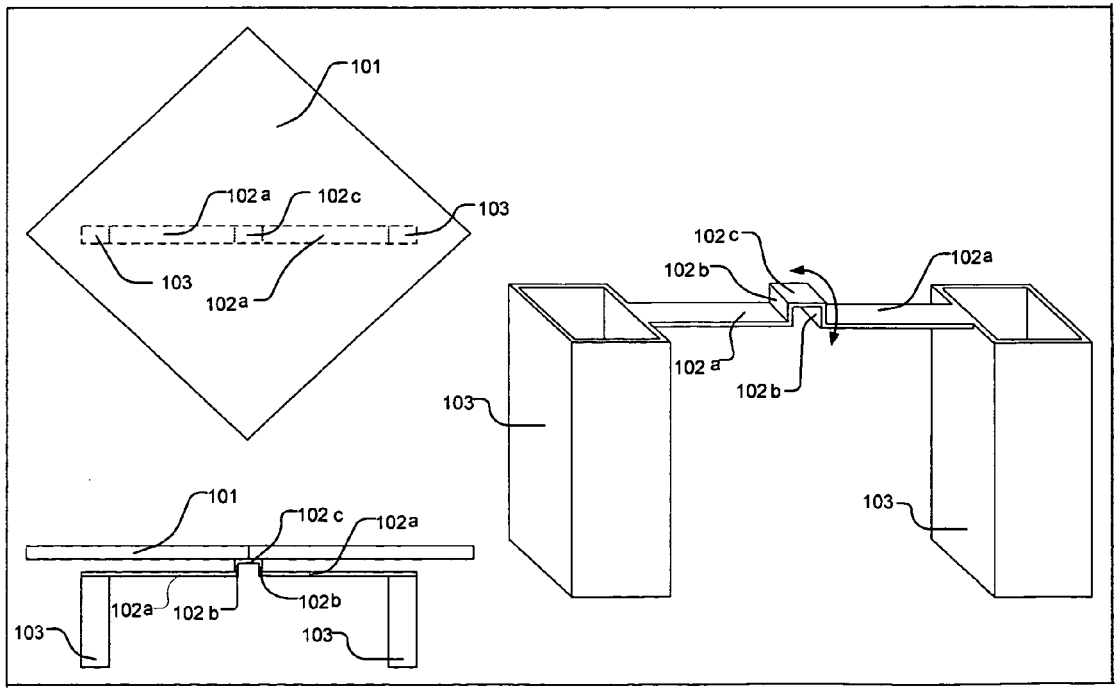

FIGS. 3A and 3B show top, side and perspective views of the hinge according to the present invention in a second alternate embodiment. In FIG. 3A hinge 102 is a torsion hinge and is composed of segments 102a and 102b. Segments 102a are extensions of support posts 103. Segments 102a extend horizontally away from support posts 103 toward each other and gradually bend vertically near the center where they meet horizontal segment 102b. FIG. 3B shows a slight modification to the alternate embodiment in FIG. 3A in which segments 102a do not bend, but instead connect to vertical segments 102b and segments 102b connect to horizontal segment 102c.

Figure 4A:
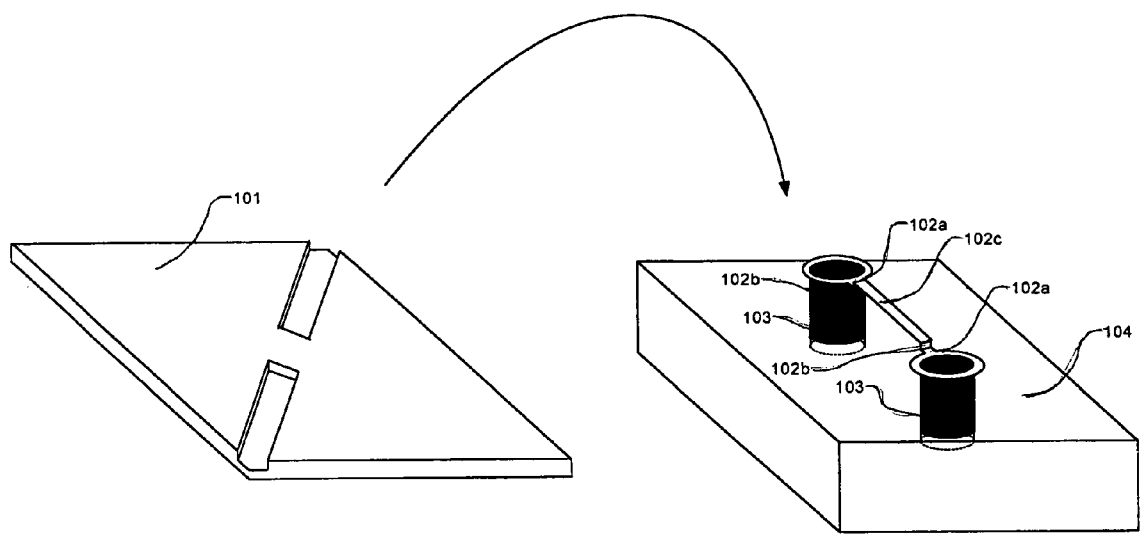
FIGS. 4A and 4B show top, side, and perspective views of the hinge according to the present invention in a third alternate embodiment.
Figure 4B:
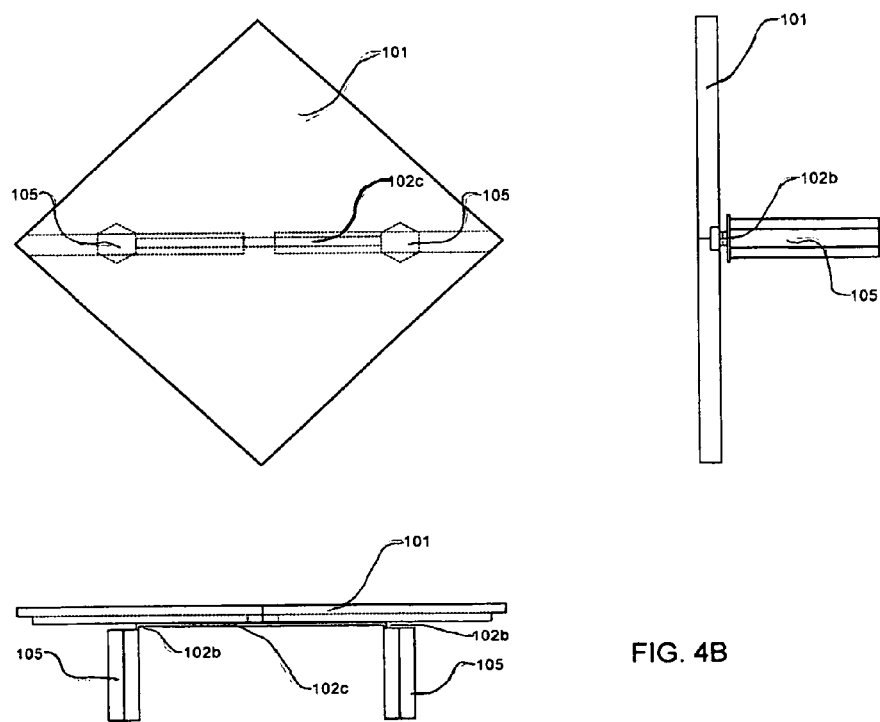

FIGS. 4A and 4B show top, side, and perspective views of the hinge according to the present invention in a third alternate embodiment. In FIG. 4A, hinge 102 is a torsion hinge and is composed of segments 102a, 102b, and 102c. Segments 102a are extensions of support posts 103. Segments 102a extend horizontally away from support posts 103 and toward each other. Horizontal segment 102a is connected to vertical segment 102b near support posts 103. The other end of vertical segment 102b is connected to horizontal segment 102c. FIG. 4B shows two slight modifications to FIG. 4A in which segment 102b extends vertically away from support posts 103 and is connected to segment 102c, thus eliminating segment 102a. This figure also shows a polygon shaped support post 103 instead of round shaped support post 103. For the embodiments described in FIGS. 4A and 4B, the micro-mirror surface opposite the substrate must be raised away from segment 102c except near the center where micro-mirror 101 comes into contact with segment 102c.

Figure 5A:
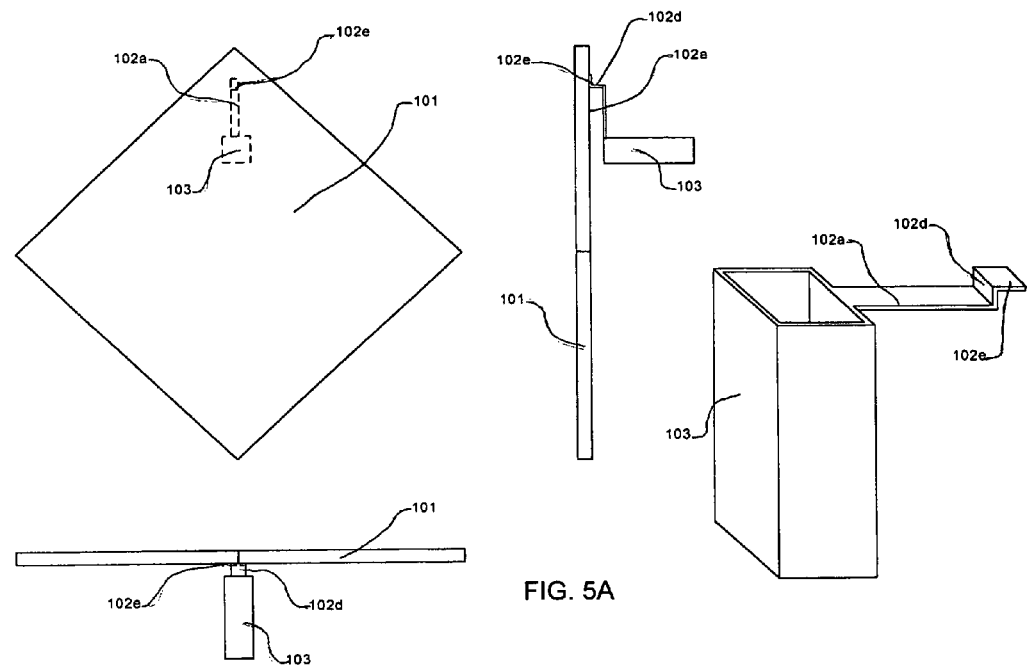
FIGS. 5A and 5B show top, side, and perspective views of the hinge according to the present invention in a fourth alternate embodiment.
Figure 5B:
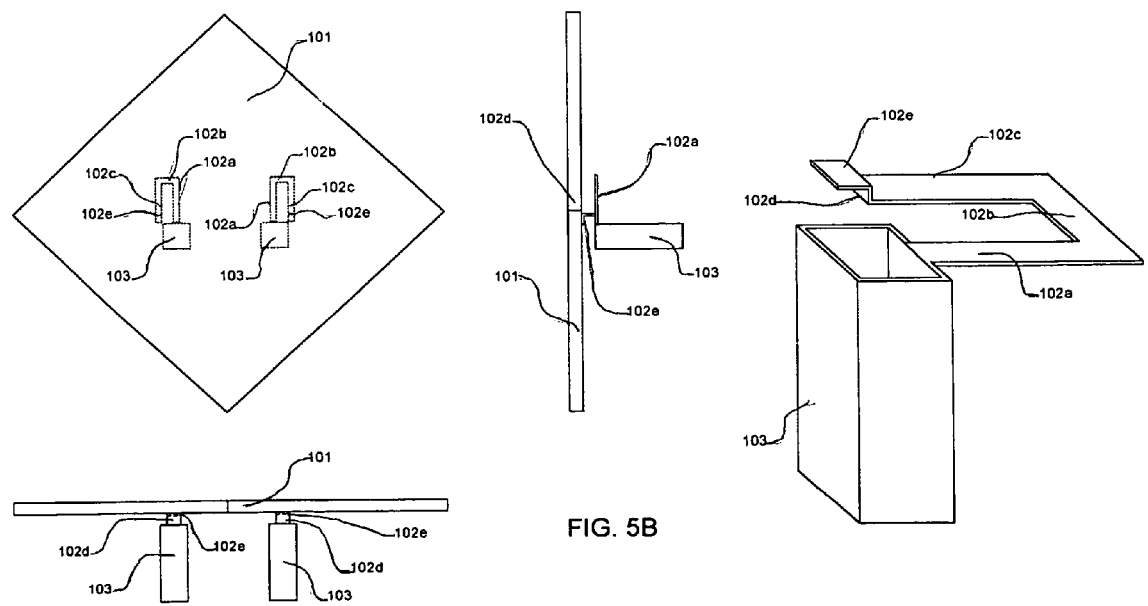

FIGS. 5A and 5B show top, side, and perspective views of the hinge according to the present invention in a fourth alternate embodiment. In FIGS. 5A and 5B, hinge 102 is a cantilever and is composed of segments 102a, 102d, and 102e. Segment 102a is an extension of support post 103. In FIG. 5A, segment 102a extends away from support post 103 horizontally and connects to vertical segment 102d. Vertical segment 102d connects to horizontal segment 102e. Segment 102e connects directly to the surface of the micro-mirror opposite the substrate. In FIG. 5B, hinge 102 is composed of segments 102a, 102b, 102c, 102d and 102e. Segment 102a extends out horizontally and away from support post 103 and connects to segment 102b which runs parallel to the substrate surface and perpendicular to segment 102a. Segment 102b is connected to segment 102c. Segment 102c is connected to vertical segment 102d. Segment 102d is connected to horizontal segment 102e. Segment 102e is connected to the surface of micro-mirror 101 opposite the substrate. In addition, FIG. 5B shows two hinges (102) supporting micro-mirror 101.

Figure 6:
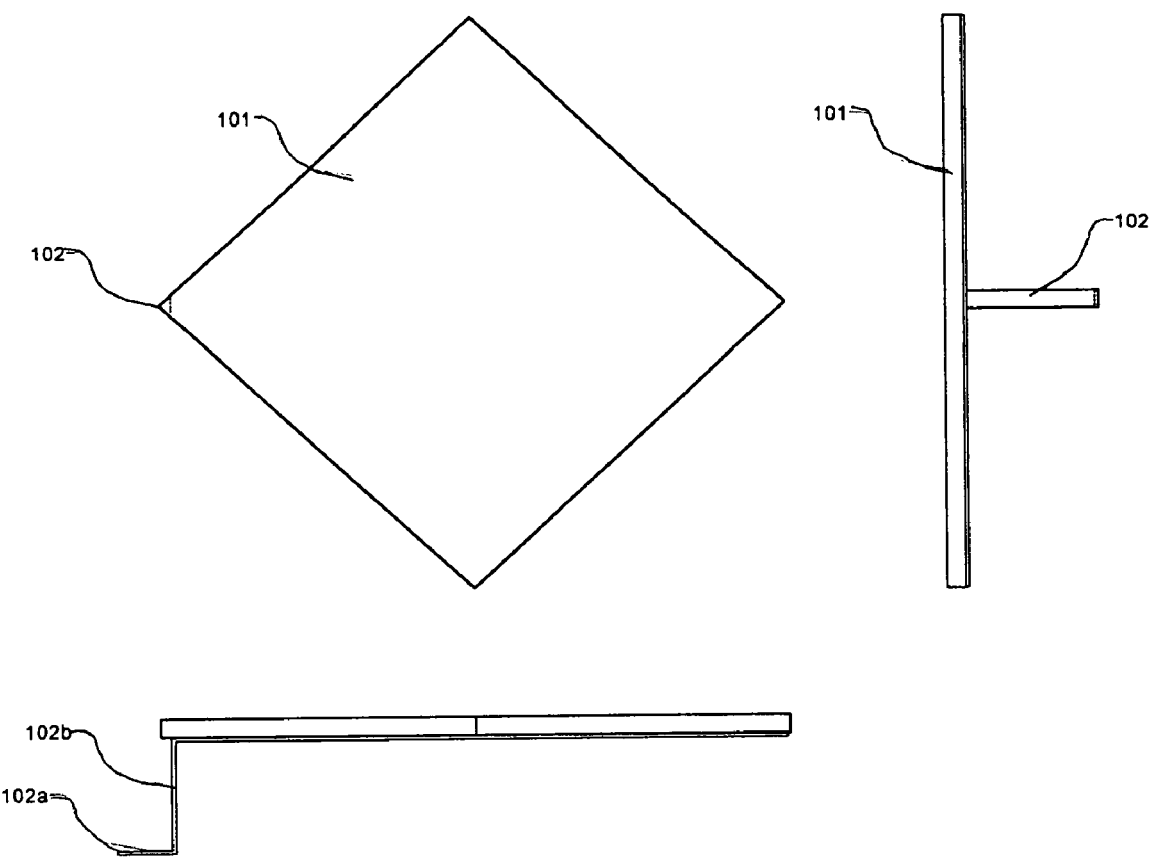
FIG. 6 shows top and side views of the hinge according to the present invention in a fifth alternate embodiment.

FIG. 6 shows top and side views of the hinge according to the present invention in a fifth alternate embodiment. In FIG. 6, hinge 102 is a vertical cantilever and is composed of two segments 102a and 102b. Segment 102b extends away from the substrate surface and connects directly to micro-mirror 101. The hinge (102) is directly anchored to the substrate by horizontal extension 102a.

The structures described in the preferred and alternative embodiments of the present invention can be composed of a doped semiconductor convenient to conventional processing steps used during the fabrication of micro-mirror devices.

Various semiconductors are available for micro-mirror device manufacturing and are typically selected based on the specific application and control circuit design of the device. In general, semiconductors consist of elemental semiconductors, III-V compound semiconductors, II-VI compound semiconductors, IV compound semiconductors, and alloy semiconductors. Specific examples are silicon (Si), germanium (Ge), gallium arsenide (GaAs), indium gallium arsenide (InGaAs), indium phosphide (InP), and silicon germanium (SiGe). In the case of silicon, the material has been further subcategorized as amorphous, polycrystalline, or single crystal silicon. The source of this material within the manufacturing process can be an SOI substrate, an SOS substrate, a bulk substrate wafer slice from single crystal ingot, epitaxial layers or from thin film deposition. Common epitaxy methods include solid-phase epitaxy, vapor-phase epitaxy, liquid-phase epitaxy, and molecular-beam epitaxy. Common thin film deposition methods are deposition by electron-beam, filament, flash, or physical evaporation, sputtering, and chemical vapor deposition (CVD). Various CVD methods exist and are currently being developed. A few examples include electron resonant CVD, MOCVD, HFCVD, Cat-CVD, APCVD, LPCVD, and PECVD.

Impurities can be added to these materials to change their mechanical and electrical characteristics by various processes including constant-source diffusion, limited-source diffusion, two-step diffusion, substrate autodoping, substrate out-diffusion, and ion-implantation. Two-step diffusion is the process in which a short constant-source diffusion called the predeposition step is followed by a limited-source diffusion called the drive-in step. Impurities can also be introduced during deposition or crystallization, also known as in situ. While these impurities can be chosen from almost any element in the periodic table, the impurities most commonly used are group III, group IV, group V, and group VII elements. Some examples of these impurities are fluorine, silicon, phosphorous, boron, arsenic, antimony, gallium, indium and aluminum. The source of these impurities can be layers of silicon glass such as PSG, BSG, BPSG, AsSG, and SbSG. Numerous other solid, liquid, and gaseous sources exist as well. Examples of these are arsine, diborane, phosphine, boron trioxide, trimethylborate, boron nitride, boron tribromide, phosphorous pentoxide, ammonium monophosphate, ammonium dipohsphate, phosphorus oxycloride, arsenic trioxide, antimony trioxide, antimony pentachloride, silane, dichlorosilane, and stabine.

In the case where impurities are added by ion-implantation, annealing is required to electrically activate the implanted impurities as well as to remove damage caused by the implantation. Many methods exist to carry out this process including furnace annealing, laser annealing, rapid thermal annealing, lamp annealing and electrical conduction heating.

The final assembly of the micro-mirror unit can be completed by a few different methods. Examples of these methods are self-assembly, wafer bonding, and monolithic fabrication. Self-assembly is achieved by adding the substrate and micro components to a wet solution in which the micro components self attach themselves to the binding sites on the substrate. Wafer bonding permits the joining of semiconductor devices to other materials or substrates and consists of adhesive bonding, silicon fusion bonding, and anodic bonding. Monolithic fabrication involves the use of several processing steps such as oxidation, photolithography, etching, diffusion, evaporation or sputtering, chemical vapor deposition, ion implantation, epitaxy, and annealing to build devices on the substrate.

In the preferred embodiment, the present invention is implemented in a CMOS manufacturing process. Polycrystalline silicon, also known as polysilicon is a material that is commonly available in a CMOS manufacturing process. The preferred source of the polysilicon is a thin film deposited by LPCVD, doped by ion-implantation using phosphine gas and annealed by rapid thermal annealing. The preferred method of final assembly is monolithic fabrication of the micro-mirror on the substrate.

The advantage of having such a wide array of materials and doping methods to construct the hinge is that the present invention can simplify the manufacturing of present micromicro devices.

The hinge structure in the preferred and alternative embodiments offer different advantages over the prior art. With respect to prior art utilizing a doped or undoped semiconductor hinge, the present invention offers an increase in the density of micro-mirror devices manufactured on a substrate by placing the device on a different plane from the support structure. With respect to prior art describing alternating layers of hinge materials, the present invention offers a simplified process by implementing a hinge composed of a single material. Furthermore, the present invention is robust under extreme temperatures as well as immune to metal creep. With respect to the prior art in which the hinge is hidden from incoming light, the present invention eliminates the need for support pillars or spacervias connecting the hinge to the micro-mirror. This simplifies the manufacturing process, eliminates Fraunhofer diffraction due to spacervias and provides for an optically flat mirror.

With hinges formed with semiconductor materials such as silicon, a high temperature process is required to anneal or crystallize the silicon hinges in order to increase the strength of the hinges. The annealing temperature is typically 900 to 1000 Celsius. However, such high temperature for annealing process when applied to the micromirror hinges, unless localized, will damage the metal wires. The metal wires are required for transmitting signals and control of the micromirrors. Therefore, one method to carry out the annealing and crystallization process is to apply the high temperature to the hinges before the formation of the metal wires such that a high temperature process is no longer required once the annealing and crystallization is completed.

In order to apply high temperature to anneal the hinges before the metal wires are formed, another technical difficulty arises due the fact that the metal wires are to be formed between the hinges. These hinges can be as tall as 5 micrometers and the formation of the aluminum wires are to be completed between these tall and narrow posts. The process involves the application of a photolithograph process that includes a photo resist coating, exposure, development and etching. In order to achieve accurate linewidth of the metallic wires, it is essential to coat a photo resist layer with uniform thickness in the area where aluminum wires are to be formed. However, forming a uniform photo resist layer between the narrow and tall posts is a process that is generally unknown and has not been explored and reported before.

For the purpose of assuring the uniform photo resist layer can be formed between the narrow and tall post, this invention begins with a theoretical analysis of a spin coating process. The analyses of the present invention involve the velocity of photo resist among the hinges as tall and narrow posts on a wafer surface during a spin coating process with various speed and a variation of viscosities. Within practical ranges of spin speeds and viscosities, the flow of the photo resist is a laminar flow and no turbulent phenomenon occurs. The present invention interprets that a uniform photo resist layer is formed between the hinges under the conditions when no turbulent flow occurs during a spin coating process.

Figure 7A:
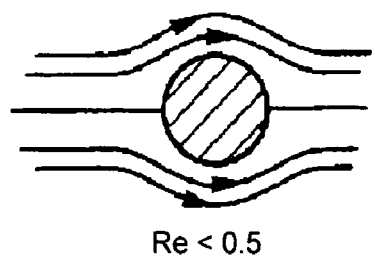
FIGS. 7A and 7B show the conditions for cause laminate and turbulent flows behind a post for applying a photo resist between the micromirror hinges.
Figure 7B:
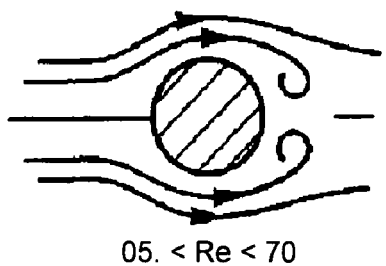

A wafer of six inches spin coated with 1000 to 3000 RPM spin speed with viscosity of photo resist 20 centi-Poise. The velocities are then calculated at different distances from the hinges. Referring to FIGS. 7A and 7B for the condition to cause turbulent flow behind a post. In FIG. 7A, the analyses are based on the following functional relationships:

$$Re = \rho * v * d/\mu$$

(Re=Reynolds number)
$\rho$=density of fluid=$1 \times 10^3$ kg/m^3
$\mu$=viscosity of fluid=$20 \times 10^{-3}$ Pa·s
(1 centi-Poise=$1 \times 10^{-3}$ Pa·s)
v=velocity of fluid (m/s)
d=diameter of column=$2 \times 10^{-3}$ m
Re<0.5 Laminar flow
0.5<Re<70 Transitional
70<Re Vortex Further analyses are performed with the condition that the diameter of the posts is 2 micrometers, when the viscosity is 20 centi-Poise; the flow behind the post is laminar flow when the velocity is under 5 meters/sec. If the viscosity is 100 centi-Poise, the flow behind the post is laminar flow if the velocity is under 25 meters/sec. The analyses confirm that with practical ranges of viscosities of photo resist commonly used, there would have no turbulent flow under 3000 RPM, specifically when the Reynolds number is below 70, i.e., Re<70.

Figure 10A:
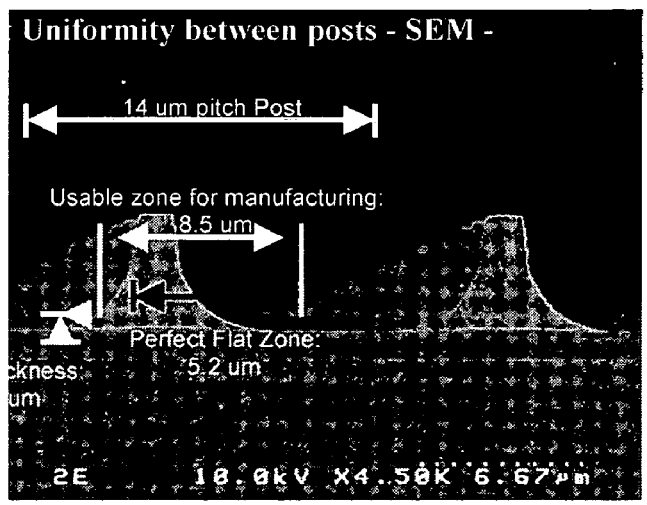
FIGS. 10A to 10B are photographic image and a side cross-sectional view respectively of photoresist spin coating tests for showing the resist layer uniformity.
Figure 10B:
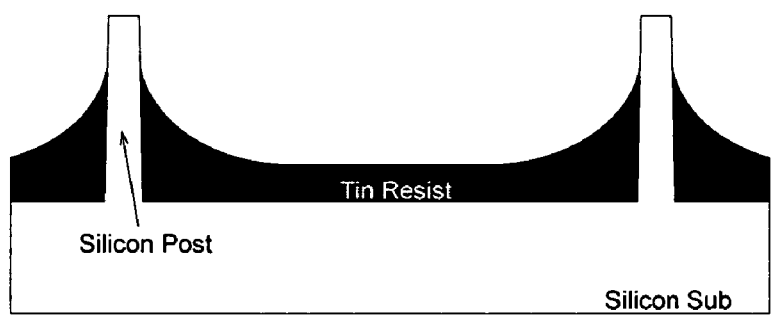

Tests are conducted the purpose of assuring the uniform photo resist layer can be formed between the narrow and tall posts, i.e., the hinges. The posts of 5 microns tall, one-micron diameter with 14 or 10 microns interval are made by the fabrication etching silicon wafers as shown in FIGS. 8A to 8C. Five different resists under eight different process conditions are used to evaluate resist coating in the presence of the posts to evaluate which viscosity range, and which spin speeds would be most effective at creating a planar resist film with minimum streaks that is also known as striations or "comets" across the wafer. The photo resist was applied over the wafers having the posts with a spin coater and a spray coater. The test results show very good results. FIGS. 9A to 9D shows the test results of the resist uniformity. For the 14 micron interval posts, the flat zone of photo resist below 3% deviation of thickness was about 5.5 micron wide and the area below 20% deviation of thickness was about 8 micron wide. FIGS. 10A and 10B are the test results and general side cross sectional view of the silicon post and the resist thickness between the micromirror hinges as confirmed by the test results that can be further summarized in the table below.

| Distance from the side of post | Deviation of thickness |
| --- | --- |
| 1µ | 90% |
| 2µ | 32% |
| 3µ | 5% |

The actual test results indicate that lines can be formed even 1 micron from the side of posts with some deformation of the lines. If some deformation is allowed, the result indicates that lines were formed at the area of even 90% deviation of thickness. It is estimated that metal lines can be formed below 50% deviation of photo resist thickness.

Instead of applying a spin coating in the process of forming photoresist for lithographic patterning of the metal traces in the spaces between the hinges as tall posts, an alternate method is applying a spray coating. A uniform photoresist layer can be formed since the small photoresist particles are spread uniformly on the spaces between the micromirror hinges thus enable precise patterning and formation of metal traces between the hinges.

Figure 11:
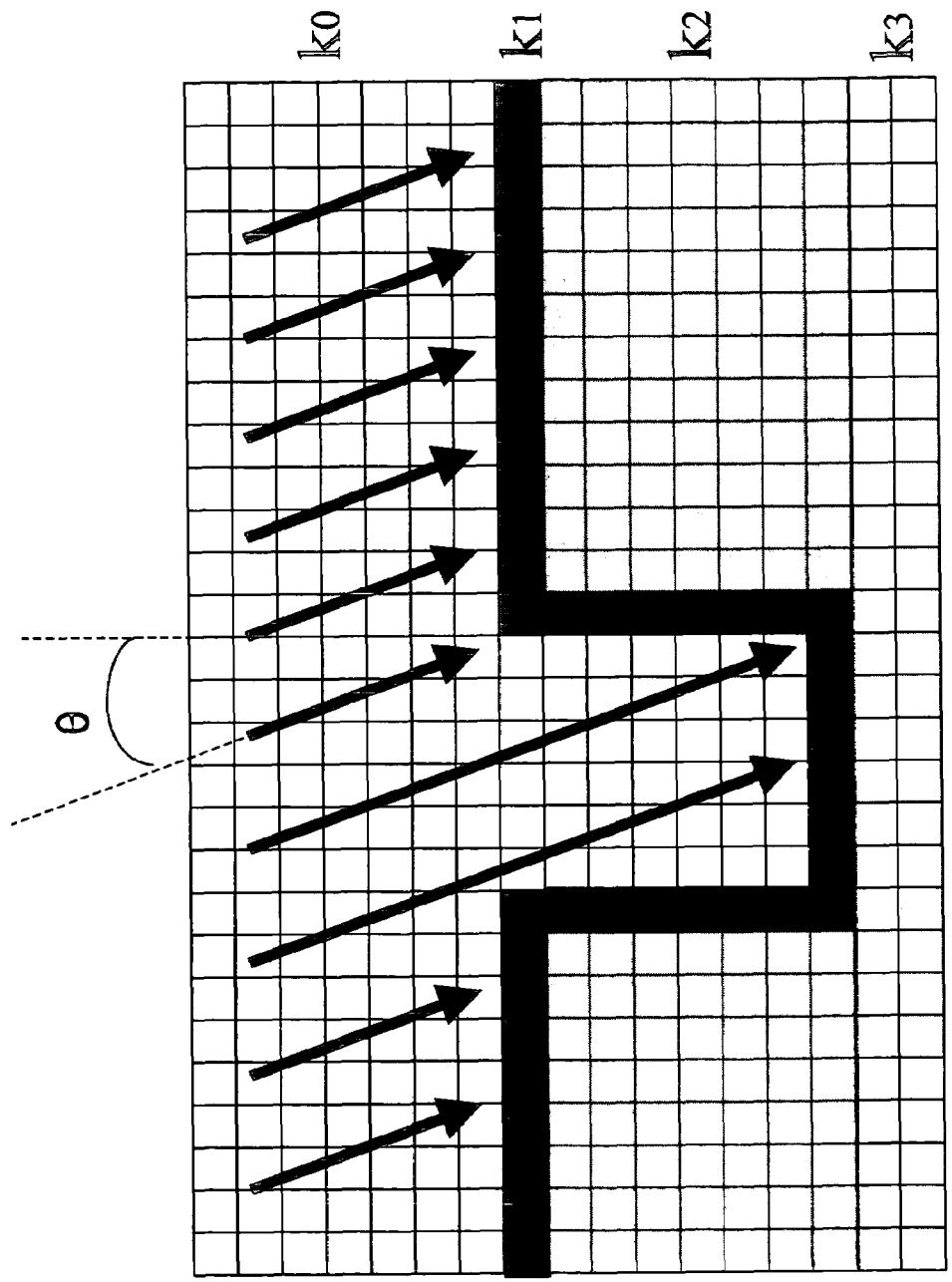
FIG. 11 is a side cross sectional view for showing the application of laser beam for annealing and crystallizing the micromirror hinge.

An alternate process to anneal and crystallize the hinges is to apply the high temperature to the hinges locally after the formation of the metal wires. The hinges are heated and annealed by applying a laser projection onto the hinges. Because the heat is applied locally to the hinges, no damages to the metal wire occur. FIG. 11 is a diagram to show the application of laser projection to the hinges. The annealing laser 160 as shown is applied with a tilted incident angle relative to the hinges to apply the heat locally that heats up the hinges and anneals and crystallizes the semiconductor hinges thus increases the strength of the hinges. In addition to the laser heating process applied to locally to the micromirror hinges, another method of carrying out a crystallization by elevating temperature is to conduct an electric current through the micromirror hinges. The temperature at the micromirror hinges is increased because of the resistance of the micromirror hinges when an electric current is conducted through the hinges.

According to FIGS. 7A and 7B and the descriptions above, this invention discloses a method for manufacturing an image display system including a plurality of micromirrors each supported on a semiconductor hinge wherein the hinge is annealed with an elevated temperature prior a photo resist layer is formed between the hinges. In a preferred embodiment, the photo resist is coated by applying a spin coating process with the photo resist spun as a laminar flow between the semiconductor hinges. In a preferred embodiment, the photo resist is coated by applying a spin coating process with the photo resist spun as a flow having a Reynolds number substantially in a range of 0.5<Re<70.

Though the invention has been described with respect to specific preferred and alternative embodiments, many additional variations and modifications will become apparent to those skilled in the art upon reading the present application. Referring again to FIGS. 1A and 1B, one such modification is comprised of segment 102b connected directly to segment 102d, thus eliminating extension 102c. Another variation is the use of multiple vertical cantilever segments (102b) connected to segment 102d either directly or through extensions (102c) of segment 102d. Still another variation is the use of polygon shaped support posts in place of round shaped support posts (103) and vice versa. Thus it is the intention that the appended claims be interpreted as broadly as possible in view of the prior art to include all such variations and modifications.

I claim:

1. A method for manufacturing an image display system with a plurality of micromirrors supported on a plurality of doped semiconductor hinges supported on a substrate comprising:
applying an elevated temperature for crystallizing said semiconductor hinges followed by forming a plurality of metallic lines between said hinges; and
said step of forming a plurality of metallic lines between said hinges further comprising a step of spin coating a photo resist between said hinges by spinning said photo resist as a flow between said hinges with a Reynolds number below 70, representing by 0<Re<70.

2. The method of claim 1 wherein:
said step of forming a plurality of metallic lines between said hinges further comprising a step of forming a substantially uniform photo resist layer between said hinges following by applying a photolithographic etching process to form said metallic lines between said hinges.

3. The method of claim 1 wherein:
said step of forming a plurality of metallic lines between said hinges further comprising a step of spin coating a photo resist between said hinges by spinning said photo resist as laminar flow between said hinges.

4. The method of claim 1 wherein:
said step of forming a plurality of metallic lines between said hinges further comprising a step of spray coating a photo resist between said hinges by spraying said photo resist as spray particles to areas between said hinges.

5. The method of claim 1 further comprising:
forming a plurality of reflecting element on top of said hinges after said step of forming a plurality of metallic lines between said hinges.

6. The method of claim 1 further comprising:
forming a plurality of metal oxide semiconductor (MOS) transistors provided for connecting said metallic wires as driving circuit for said micromirrors.

7. An image display system comprising a plurality of micromirrors wherein:
each of said micromirrors supported on a doped semiconductor hinge hidden from an incident light projecting to said micromirrors;
said image display system further includes signal transmission metal traces disposed on areas between said doped semiconductor hinges supporting said micromirrors; and
said signal transmission metal traces are formed prior to an elevated temperature is applied locally to crystallize said hinges by a laser heating process with a laser beam projecting toward said hinges to heat said hinges to a temperature substantially above 600 Celisus.

8. The image display system of claim 7 wherein:
said hinge is a type selected from a group consisting of cantilever hinge, vertical cantilever hinge, torsion hinge, and compound torsion vertical cantilever hinge.

9. The image display system of claim 7 wherein:
said doped semiconductor hinge composed of a semiconductor selected from a group consisting of elemental semiconductors, III-V compound semiconductors, II-VI compound semiconductors, IV compound semiconductors, and alloy semiconductors.

10. The image display system of claim 7 wherein:
said doped semiconductor hinge composed of a doped semiconductor formed by a process selected from a group of processes consisting of deposition of solid-phase epitaxy, deposition of vapor-phase epitaxy, deposition of liquid-phase epitaxy, deposition of molecular-beam epitaxy, thin film deposition of physical evaporation, thin film deposition of electron-beam evaporation, thin film deposition of filament evaporation, thin film deposition of flash evaporation, thin film deposition of sputtering, thin film deposition of CVD, bulk substrate wafer slice from single crystal ingot, SOS substrate, and SOI substrate.

11. The image display system of claim 7 wherein:
said doped semiconductor hinge composed of a semiconductor doped with a dopant selected from a group consisting of group III elements, group IV elements, group V elements, and group VII elements is introduced into said semiconductor.

12. The image display system of claim 7 wherein:
said doped semiconductor hinge composed of a doped semiconductor formed by a doping process selected from a group of processes consisting of ion-implantation, constant-source diffusion, limited-source diffusion, two-step diffusion, substrate autodoping, substrate out-diffusion, in situ deposition, and in situ crystallization.

13. The image display system of claim 7 wherein:
said doped semiconductor hinge composed of a doped semiconductor formed by using a dopant source selected from a group consisting of a solid dopant source, a liquid dopant source; a vapor dopant source, and a gas dopant source.

14. The image display system of claim 7 wherein:
said doped semiconductor hinge composed of a crystallized doped semiconductor formed by applying a crystallization process selected from a group of crystallization processes consisting of furnace annealing, laser annealing, rapid thermal annealing, lamp annealing, and electrical conduction heating.

15. The image display system of claim 7 wherein:
said doped semiconductor hinge composed of a doped semiconductor formed by using a dopant source selected from a group consisting of PSG, BSG, BPSG, AsSG, SbSG, Arsine, diborane, phosphine, boron trioxide, trimethylborate, boron nitride, boron tribromide, phosphorus pentoxide, ammonium monophosphate, ammonium diphosphate, phosphorus oxychloride, arsenic trioxide, antimony trioxide, antimony pentachloride, silane, dichlorosilane, and stabine.

16. The image display system of claim 7 wherein:
said doped semiconductor hinge is formed by applying a process selected from a group of processes consisting of self-assembly, adhesive bonding, silicon fusion bonding, anodic bonding, and monolithic fabrication.

17. The image display system of claim 7 wherein:
said micromirrors further comprising a reflecting surface for reflecting and projecting an image for display.

18. The image display system of claim 7 wherein:
said doped semiconductor hinge composed of a semiconductor selected from a group consisting of amorphous silicon, polycrystalline silicon, and single crystal silicon.

19. The image display system of claim 7 wherein:
said doped semiconductor hinge composed of a doped semiconductor formed by using a doping a semiconductor layer formed by a process selected from a group of processes consisting of deposition of solid-phase epitaxy, deposition of vapor-phase epitaxy, deposition of liquid-phase epitaxy, deposition of molecular-beam epitaxy, thin film deposition of physical evaporation, thin film deposition of electron-beam evaporation, thin film deposition of filament evaporation, thin film deposition of flash evaporation, sputtering deposition of thin film, CVD thin film deposition, bulk substrate wafer slice from a single crystal ingot, SOS substrate, or SOI substrate.

20. An image display system comprising a plurality of micromirrors wherein:
each of said micromirrors supported on a doped semiconductor hinge hidden from an incident light projecting to said micromirrors:
said image display system further includes signal transmission metal traces disposed on areas between said doped semiconductor hinges supporting said micromirrors; and
said signal transmission metal traces are formed prior to an elevated temperature is applied locally to crystallize said hinges by a laser heating process with a laser beam projecting toward said hinges with an tilted incident angle substantially between 10 to 80 degrees relative to said hinges.

21. A method for manufacturing an image display system with a plurality of micromirrors supported on a plurality of doped semiconductor hinges supported on a substrate comprising:
applying a laser beam to each of said hinges for annealing said semiconductor hinges after forming a plurality of metallic lines between said hinges.

22. The method of claim 21 wherein:
said step of applying a laser beam for annealing said hinges comprising a step of applying a laser beam with an tilted incident angle substantially between 10 to 80 degrees relative to said hinges.

23. The method of claim 21 wherein:
said step of applying a laser beam for annealing said hinges comprising a step of applying a laser beam to heat said hinges to a temperature substantially above 600 Celsius.

24. The method of claim 21 further comprising:
forming a plurality of reflecting element on top of said hinges after said step of annealing said hinges.

25. The method of claim 21 further comprising:
forming a plurality of metal oxide semiconductor (MOS) transistors provided for connecting said metallic wires as driving circuit for said micromirrors.

26. The image display system of claim 7 further comprising:
a layer around said hinge comprising at least two materials with different thermal conductivities.

27. The image display system of claim 20 wherein:
a layer around said hinge comprising at least two materials with different thermal conductivities.

* * * * *